United States Patent [19]
Sano et al.

[11] Patent Number: 5,486,925
[45] Date of Patent: Jan. 23, 1996

[54] DISPLACEMENT SENSING APPARATUS FOR A MOVABLE MEMBER

[75] Inventors: Masashi Sano; Tadayoshi Ogawa, both of Kyoto, Japan

[73] Assignee: Rohm Co., Ltd., Kyoto, Japan

[21] Appl. No.: 69,772

[22] Filed: Jun. 1, 1993

[51] Int. Cl.⁶ .......................... G01B 11/14; G01B 11/02
[52] U.S. Cl. .................... 356/373; 356/387; 356/385; 345/163; 341/13
[58] Field of Search .................... 356/373, 372, 356/385, 387, 376; 250/576, 221, 222.2, 231.14; 345/163–166; 341/13, 31

[56] References Cited

U.S. PATENT DOCUMENTS

| | | | |
|---|---|---|---|
| 4,912,322 | 3/1990 | Ichikawa | 356/373 |
| 4,971,445 | 11/1990 | Sato et al. | 356/376 |
| 5,008,528 | 4/1991 | Duchon | 250/221 |
| 5,194,919 | 3/1993 | Katayama | 356/373 |
| 5,252,968 | 10/1993 | Donovan | 250/231.14 |
| 5,276,323 | 1/1994 | Nakaho | 250/231.14 |

FOREIGN PATENT DOCUMENTS

| | | | |
|---|---|---|---|
| 0225318 | 12/1984 | Japan | 356/373 |
| 2-89314 | 2/1990 | Japan | |
| 0157582 | 6/1993 | Japan | |

*Primary Examiner*—Robert P. Limanek
*Assistant Examiner*—Alexander Oscar Williams
*Attorney, Agent, or Firm*—Nikaido, Marmelstein, Murray & Oram

[57] ABSTRACT

A light receiving portion which receives light from a light emitting portion through slits formed in a rotating disc is provided with, first, second and third photodiodes. With an output of the second photodiode as a reference value, an output of the first photodiode is compared with the reference value and pulsed by a first comparator, and an output of the third photodiode is compared with the reference value and pulsed by a second comparator. With such a light receiving apparatus, since the output (reference value) of the second photodiode similarly decreases when the outputs of the first and third photodiodes decrease due to a decrease of the light quantity of the light emitting portion, the deviation of the phase difference never occurs between outputs of the first and second comparators.

5 Claims, 6 Drawing Sheets

DISPLACEMENT SENSING APPARATUS FOR A MOVABLE MEMBER

BACKGROUND OF THE INVENTION

1. Field of the Invention

The present invention relates to a displacement sensing apparatus for a movable member, and more particularly, to a displacement sensing apparatus for use in an optical encoder and a mouse.

2. Description of the Prior Art

FIGS. 1 and 2 show a conventional displacement sensing apparatus for a movable member for use in an encoder and a mouse. FIG. 1 is a perspective view. FIG. 2 is a view schematically showing the displacement sensing apparatus including its circuit portion. This structure is disclosed by Japanese Laid-open Utility Model Application H2-89314.

The displacement sensing apparatus includes a light emitting portion 61 having a light emitting diode (LED) 60, a rotating disc 63 in which a plurality of slits 62 are formed along its circumference, a light receiving portion 66 having two photodiodes 64 and 65, and comparators 67 and 68 for comparing outputs of the two photodiodes 64 and 65 of the light receiving portion 66 with a reference voltage Vref.

Light emitted from the light emitting portion 61 passes through the slits 62 of the rotating disc 63 which is rotating, and reaches the light receiving portion 66. Outputs of the photodiodes 64 and 65, which are current values, are converted into voltage values by current-to-voltage converters 69 and 70, and compared with the reference voltage Vref by the comparators 67 and 68, respectively.

FIG. 3 shows outputs (voltage values) 64a and 65a of the photodiodes 64 and 65. FIG. 4 shows outputs 67a and 68a of the comparators 67 and 68. In FIG. 3, the reference voltage Vref is represented by an alternate long and short dash line. When it is required that a phase difference between the outputs 64a and 65a of the two photodiodes 64 and 65 of the light receiving device is 90°, the positions of the photodiodes 64 and 65 are adjusted in advance so that the phase difference is 90° as shown in FIGS. 3 and 4.

However, there is sometimes nonuniformity in the light quantity of the LED 60 of the light emitting portion 61. This nonuniformity is generated at the time of manufacturing or when the light quantity gradually decreases according to the time of use. For example, when the light quantity of the LED 60 decreases, the output waveforms 64a and 65b of the photodiodes 64 and 65 decrease as shown in FIG. 5, so that if the reference voltage Vref is constant, the phase difference deviates from the desired 90° as shown in FIG. 6.

The deviation of the phase difference due to the nonuniformity of the light quantity of the LED 60 can be corrected by varying the reference voltage Vref in accordance with the light quantity. However, it requires much labor since it is necessary to individually make an adjustment with respect to all of the light receiving device, and it is impossible to completely cope with the decrease of the light quantity while the device is being used.

SUMMARY OF THE INVENTION

An object of the present invention is to provide a displacement sensing apparatus where the deviation of the phase difference between the output waveforms never occurs even when there is nonuniformity in the light quantity of the light emitting portion.

To achieve the above-mentioned object, the present invention is provided with a light emitting device and a light receiving device arranged to be opposite to each other with a predetermined space therebetween, a movable member arranged between the light emitting device and the light receiving device to be movable in a direction perpendicular to an optical axis of a light beam emitted from the light emitting device and incident on the light receiving device, and a plurality of slits formed in the movable member for allowing light emitted from the light emitting device to pass therethrough when the slits come to a position of the optical axis. At least three light receiving devices are provided. By using an output of one of the three light receiving devices as a reference value and comparing outputs of the other light receiving devices with the reference value, first and second outputs which have been pulsed are obtained.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
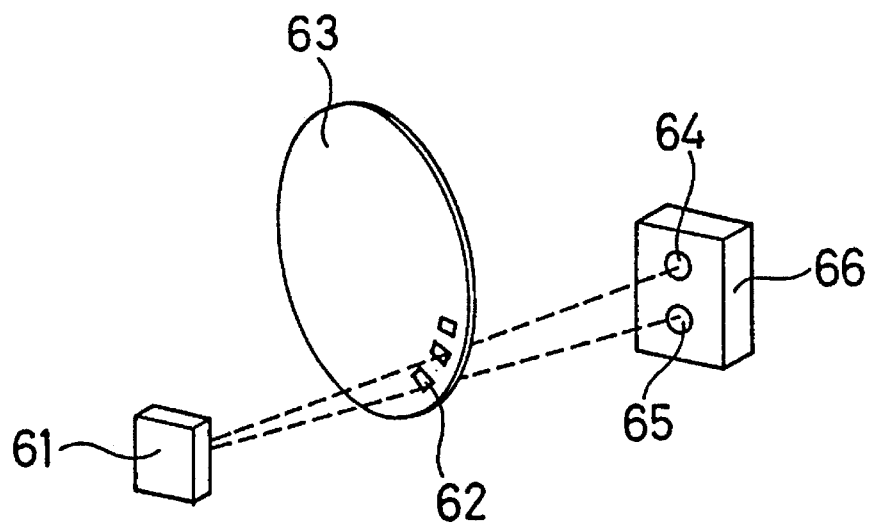
FIG. 1 is a schematic view of a conventional displacement sensing apparatus for a movable member.
Figure 2:
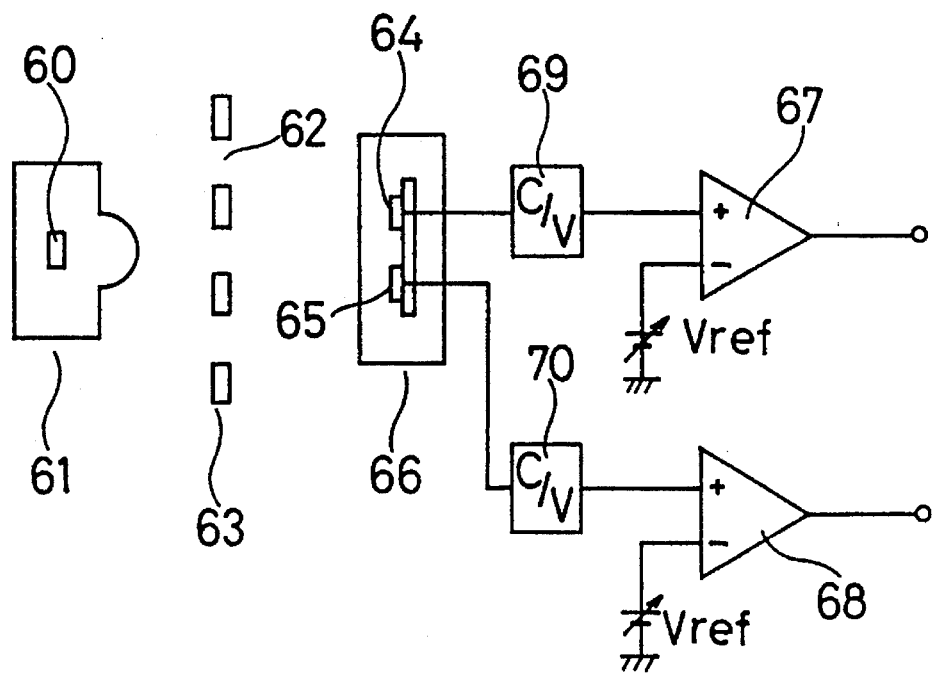
FIG. 2 is a schematic view showing the conventional displacement sensing apparatus part of which is shown as a circuit diagram.
Figure 3:
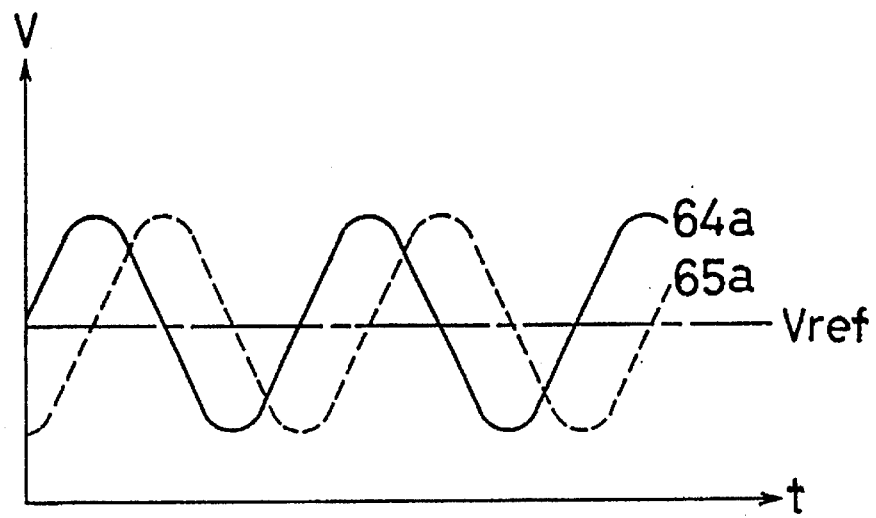
FIG. 3 shows output waveforms of light receiving devices employed in the conventional displacement sensing apparatus.
Figure 4:
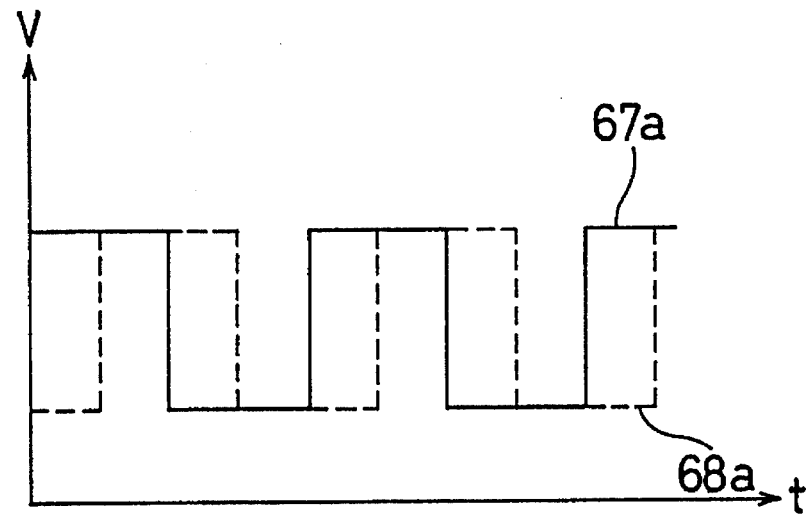
FIG. 4 shows output waveforms of comparators employed in the conventional displacement sensing apparatus.
Figure 5:
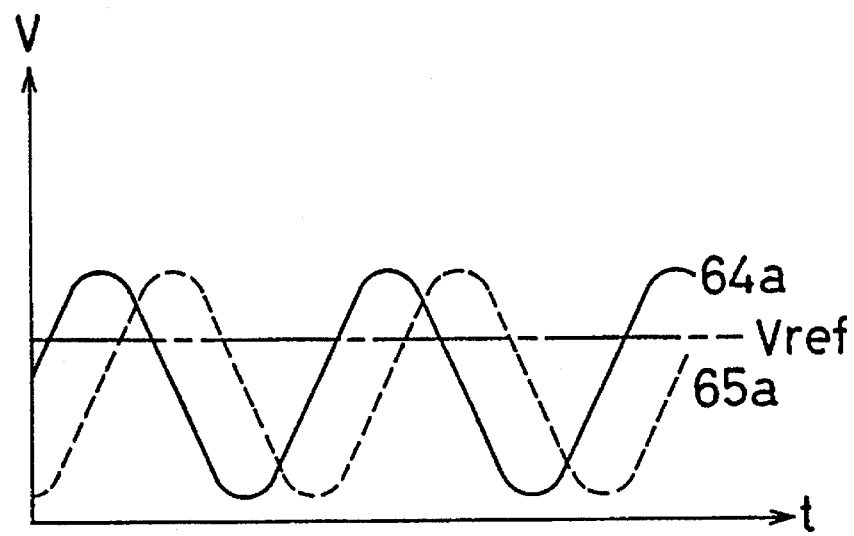
FIG. 5 shows output waveforms of the light receiving devices employed in the conventional displacement sensing apparatus when the light quantities of the light receiving devices decrease.
Figure 6:
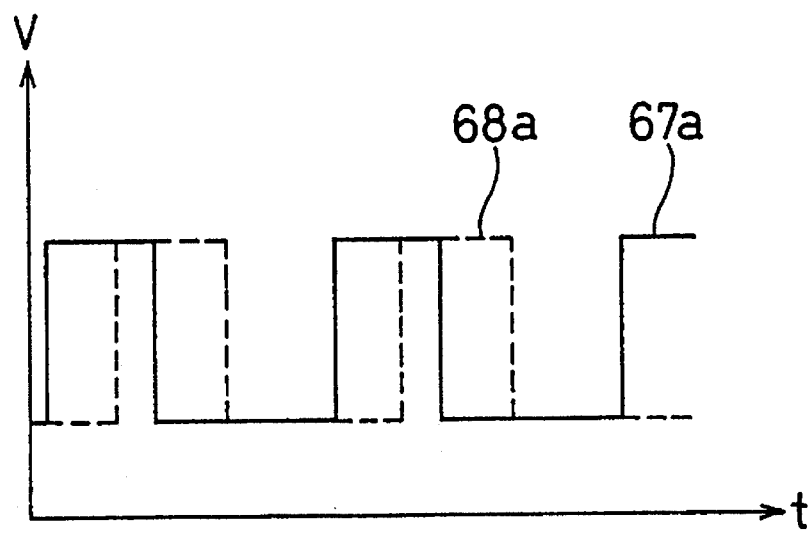
FIG. 6 shows output waveforms of the comparators employed in the conventional displacement sensing apparatus when the light quantities of the light receiving devices decrease.
Figure 7:
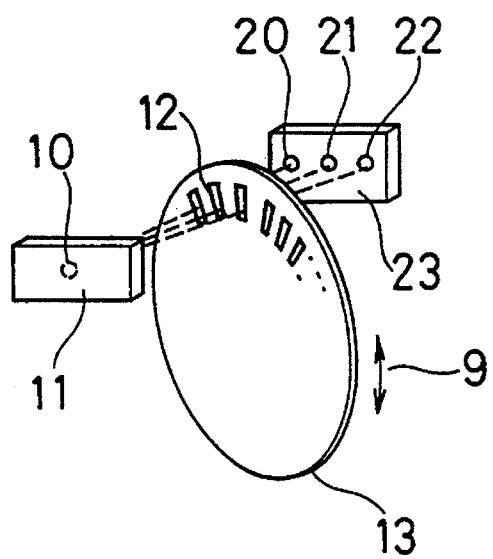
FIG. 7 is a schematic view of a displacement sensing apparatus for a movable member of the present invention.

Hereinafter, an embodiment of the present invention will be described with reference to the drawings. FIG. 7 shows a part of a displacement sensing apparatus which is the embodiment of the present invention. Numeral 11 represents a light emitting portion including a light emitting device 10 such as an LED. Numeral 23 represents a light receiving portion having first, second and third photodiodes 20, 21 and 22. The light emitting portion 11 and the light receiving portion 23 are arranged to be opposite to each other with a predetermined space therebetween. Numeral 13 represents a rotating disc which is a movable member. The rotating disc 13 is arranged between the light emitting portion 11 and the light receiving portion 23 so as to be pivotable in a direction perpendicular to an optical axis of a light beam emitted from the light emitting devices 10 and incident on the photodiodes 20, 21 and 22, that is, in the directions shown by an arrow 9. In the rotating disc 13, a large number of slits 12 are formed along its circumference with equal spaces therebetween. In actuality, the light emitting portion 11 and the light receiving portion 23 are closer to the rotating disc 13 than in the figure.

Figure 8:
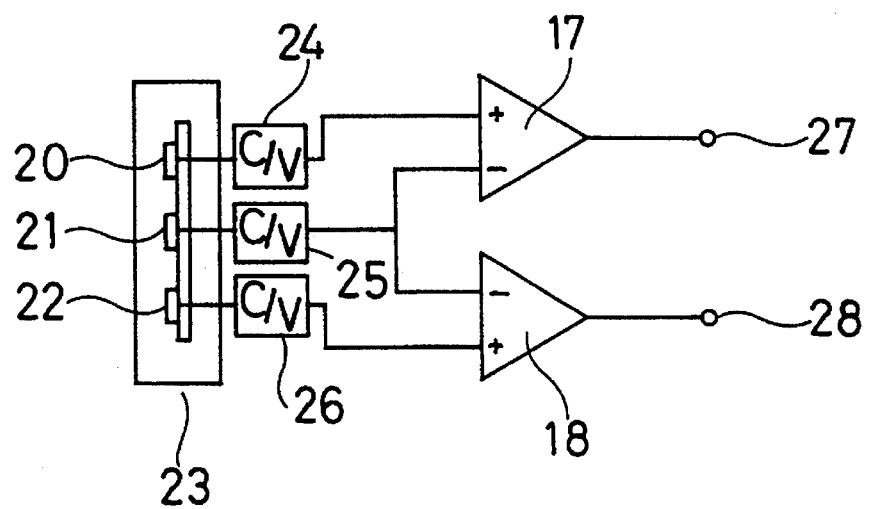
FIG. 8 shows a light receiving portion and a circuit for processing an output thereof, of the displacement sensing apparatus of the present invention.

FIG. 8 shows the light receiving portion 23 and a circuit for processing an output thereof. Output currents of the first, second and third photodiodes 20, 21 and 22 are converted into voltage values by current-to-voltage converters 24, 25 and 26. The output of the second photodiode 21 which has been converted is supplied to inverting input terminals (−) of comparators 17 and 18 as a reference voltage. The output of the first photodiode 20 which has been converted is supplied to a non-inverting terminal (+) of the first comparator 17. The output of the third photodiode 22 which has been converted is supplied to a non-inverting terminal (+) of the second comparator 18. The above two outputs are compared with the output of the second photodiode 21 which is used as the reference voltage. The outputs of the first and second comparators 17 and 18 are provided to output terminals 27 and 28, respectively.

Figure 9:
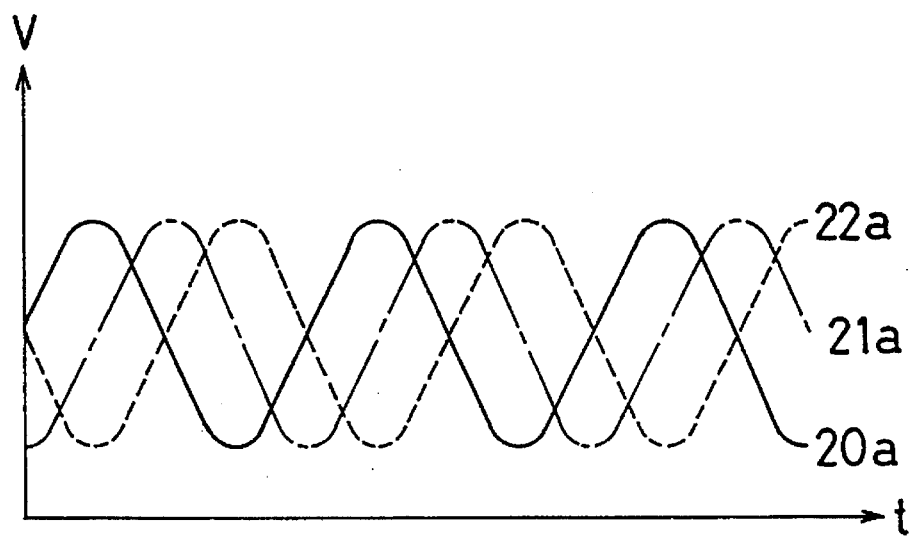
FIG. 9 shows output waveforms of light receiving devices employed in the displacement sensing apparatus of the present invention.
Figure 10:
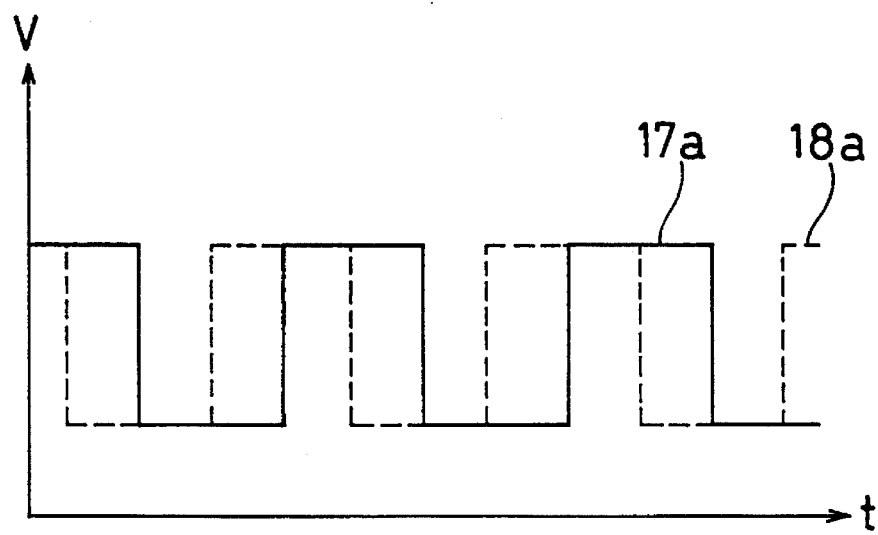
FIG. 10 shows output waveforms of comparators employed in the displacement sensing apparatus of the present invention.

FIG. 9 shows output waveforms 20a, 21a and 22a of the photodiodes 20, 21 and 22. FIG. 10 shows output waveforms 17a and 18a of the comparators 17 and 18. In FIG. 9, the output of the second photodiode 21 which is used as the reference value is represented by an alternate long and short dash line.

If the output 21a of the second photodiode 21 is used as a reference value, since the outputs 21a of the second photodiode 21 similarly decreases when the outputs 20a and 22a of the first and third photodiodes 20 and 22 of the light receiving portion 23 decrease due to the decrease of the light quantity of the light emitting portion 11, the deviation of the phase difference never occurs.

While in this embodiment, the light emitting device is an LED and the light receiving devices are photodiodes, they are not limited thereto. Moreover, while in this embodiment, the movable member is a rotating disc having slits, it is not limited thereto; it may be a rectangular plate having slits.

Figure 11:
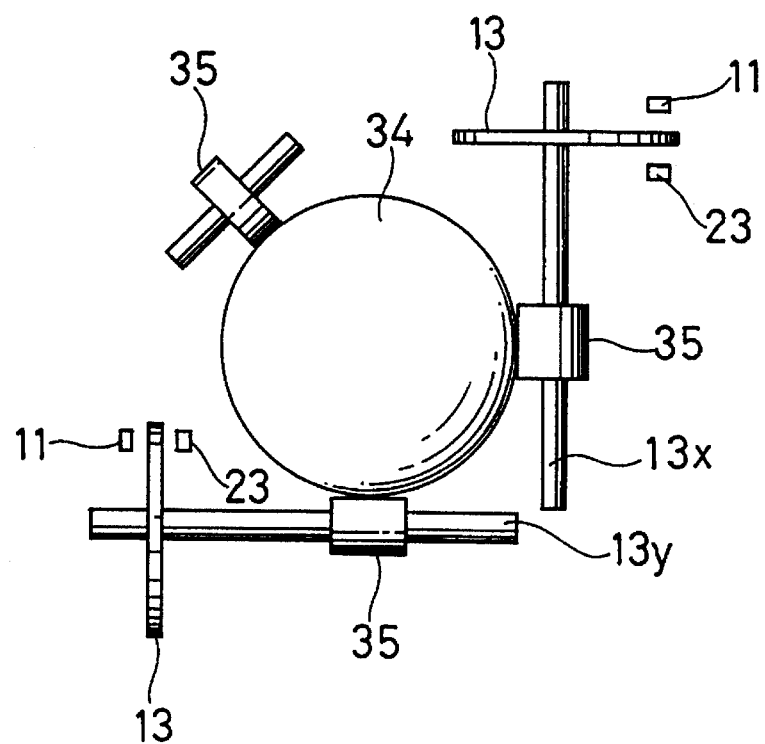
FIG. 11 is a schematic view showing a case where the present invention is employed for a mouse.
Figure 12:
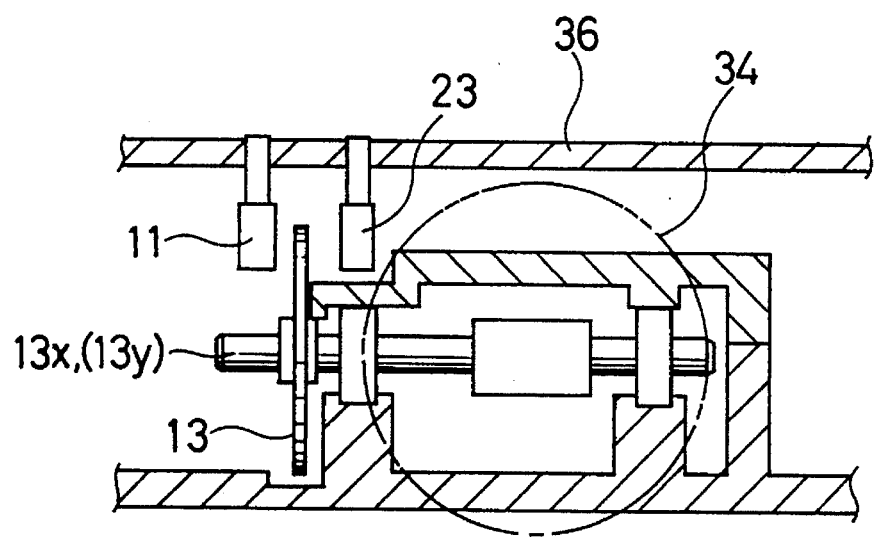
FIG. 12 is a cross-sectional view showing a part of the structure of FIG. 11.

FIGS. 11 and 12 show a mouse in which a displacement sensing apparatus of the above-described structure is incorporated. This mouse is to be used as a coordinate inputting apparatus for a computer. In the mouse, two rotating shafts 13x and 13y are arranged to be perpendicular to each other, and the periphery of each of the rotating shafts 13x and 13y abut a driving ball 34 so that the rolling of the driving ball 34 rotates the shafts 13x and 13y. Numerals 35 represent supporting rollers for preventing the abutment relationship between the driving ball 34 and the rotating shafts 13x and 13y from being broken. When the driving ball 34 is rolled on an operation surface at the time of the operation of the mouse, the movements thereof in the X and Y directions are transmitted to the corresponding rotating shafts 13x and 13y to thereby rotate the shafts 13x and 13y. To each of the rotating shafts 13x and 13y, the previously-described rotating disc 13 is integrally, pivotably attached. The light emitting portion 11 and the light receiving portion 23 are fixed to an upper wall of the body of the mouse.

In the above-described arrangement where a displacement sensing apparatus is provided to a mouse which is used as an input apparatus for a computer terminal, the rotating disc 13 is rotated by the rotation of the rotating shafts 13x and 13y, so that light from the light emitting portion 11 is intermittently incident on the light receiving portion 23. Consequently, a pulse-like waveform of high resolution is output from the light receiving portion 23. The output of the light receiving portion is current-to-voltage converted by a signal processing circuit formed on a rotating substrate (not shown) provided in the mouse, and thereafter, converted into a pulse waveform.

Obviously, many modifications and variations of the present invention are possible in light of the above teachings. It is therefore to be understood that within the scope of the appended claims, the invention may be practiced other than as specifically described.

What is claimed is:

1. A displacement sensing apparatus for a movable member, comprising:

a light emitting device and a light receiving device arranged to be opposite to each other with a predetermined space therebetween;

a movable member arranged between the light emitting device and the light receiving device to be movable in a direction perpendicular to an optical axis of a light beam emitted from the light emitting device and incident on the light receiving device; and a plurality of slits formed in the movable member for allowing light emitted from the light emitting device to pass therethrough when the slits come to a position of the optical axis, wherein at least three light receiving devices are provided, and wherein first and second comparators are provided which generate pulsed first and second outputs by using an output of one of the three light receiving devices as a reference value and comparing outputs of the other two light receiving devices with the one of the three light receiving devices used as the reference value.

2. A displacement sensing apparatus according to claim 1, wherein the movable member is a rotating disc where the plurality of slits are formed along a circumference thereof with equal spaces therebetween.

3. A displacement sensing apparatus according to claim 2, wherein when the three light receiving devices are arranged in the order of first, second and third light receiving devices, respectively, the output of the second light receiving device which outputs the reference value is behind the output of the first light receiving device by 90° and ahead of the output of the third light receiving device by 90°.

4. A displacement sensing apparatus according to claim 3, wherein in order to input a movement of a mouse into a computer as coordinate information, the rotating disc is provided to a shaft which is rotated by a rolling of a driving ball of the mouse.

5. A displacement sensing apparatus according to claim 4, wherein as said shaft, two shafts are provided to be perpendicular to each other in such a manner that they are independently driven by a driving ball, and wherein a rotating disc provided to one of the shafts and the outputs of the first and second comparators based on the outputs of the three light receiving devices arranged opposite to the rotating disc are used to represent a movement amount of the mouse in an X direction, and a rotating disc provided to the other shaft and the outputs of the first and second comparators based on the outputs of the three light receiving devices arranged opposite to the rotating disc are used to represent a movement amount of the mouse in a Y direction.

* * * * *